（12） United States Patent
Fujiyama et al.

(10) Patent No.: US 9,291,862 B2
(45) Date of Patent: Mar. 22, 2016

(54) LIQUID CRYSTAL DISPLAY APPARATUS WITH FIRST AND SECOND SPACERS

(75) Inventors: Natsuko Fujiyama, Ageo (JP); Arihiro Takeda, Saitama (JP)

(73) Assignee: Japan Display Inc., Tokyo (JP)

( * ) Notice: Subject to any disclaimer, the term of this patent is extended or adjusted under 35 U.S.C. 154(b) by 458 days.

(21) Appl. No.: 13/564,058

(22) Filed: Aug. 1, 2012

(65) Prior Publication Data

US 2013/0038827 A1 Feb. 14, 2013

(30) Foreign Application Priority Data

Aug. 12, 2011 (JP) ................................. 2011-176690

(51) Int. Cl.
*G02F 1/1339* (2006.01)
*G02F 1/1337* (2006.01)

(52) U.S. Cl.
CPC .. *G02F 1/13394* (2013.01); *G02F 2001/13373* (2013.01); *G02F 2201/40* (2013.01)

(58) Field of Classification Search
CPC ............... G02F 1/134363; G02F 1/136213; G09G 3/3655; G09G 2300/0426
USPC .................. 349/141–144, 155–157
See application file for complete search history.

(56) References Cited

U.S. PATENT DOCUMENTS

| 6,266,116 | B1 | 7/2001 | Ohta et al. | |
|---|---|---|---|---|
| 7,259,819 | B2 | 8/2007 | Yamaguchi et al. | |
| 8,896,795 | B2 * | 11/2014 | Funakoshi et al. | 349/143 |
| 8,908,140 | B2 * | 12/2014 | Moriya et al. | 349/155 |
| 2001/0010575 | A1 | 8/2001 | Yoshida et al. | |
| 2004/0165136 | A1 | 8/2004 | Sugiyama et al. | |
| 2005/0206824 | A1 | 9/2005 | Son et al. | |
| 2005/0219453 | A1 | 10/2005 | Kubo et al. | |
| 2007/0115234 | A1 | 5/2007 | Kim et al. | |
| 2008/0062358 | A1 | 3/2008 | Lee et al. | |
| 2008/0180590 | A1 | 7/2008 | Lee et al. | |
| 2008/0180623 | A1 | 7/2008 | Lee et al. | |
| 2008/0186439 | A1 | 8/2008 | Kwon et al. | |
| 2012/0154730 | A1 * | 6/2012 | Sakurai et al. | 349/141 |
| 2013/0077010 | A1 * | 3/2013 | Takeda et al. | 349/43 |
| 2013/0088657 | A1 * | 4/2013 | Takano | G02F 1/134363 349/38 |
| 2013/0093973 | A1 * | 4/2013 | Kitani | G02F 1/136 349/43 |
| 2013/0093983 | A1 * | 4/2013 | Kizu et al. | 349/96 |
| 2013/0258226 | A1 * | 10/2013 | Hasegawa et al. | 349/42 |

FOREIGN PATENT DOCUMENTS

| JP | 6-222397 | 8/1994 |
|---|---|---|
| JP | 7-159807 | 6/1995 |

(Continued)

OTHER PUBLICATIONS

U.S. Appl. No. 13/429,628, filed Mar. 26, 2012, Fujiyama, et al.

(Continued)

*Primary Examiner* — Huyen Ngo
(74) *Attorney, Agent, or Firm* — Oblon, McClelland, Maier & Neustadt, L.L.P.

(57) ABSTRACT

A liquid crystal display apparatus includes a first spacer, a second spacer which is different in height from the first spacer, and a liquid crystal layer held between an array substrate and a counter substrate. The first spacer is provided at an intersection of a source wiring line and an auxiliary capacitive line, and the second spacer is provided in at least a contact hole.

2 Claims, 7 Drawing Sheets

(56) References Cited

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 9-230380 A | 9/1997 |
| JP | 10-26765 | 1/1998 |
| JP | 10-90708 | 4/1998 |
| JP | 2004-46123 A | 2/2004 |
| JP | 2004-205549 A | 7/2004 |
| JP | 2005-3802 | 1/2005 |
| JP | 3644653 | 2/2005 |
| JP | 2005-107494 | 4/2005 |
| JP | 2005-242307 | 9/2005 |
| JP | 2007-11367 A | 1/2007 |
| JP | 4021675 | 10/2007 |
| JP | 2009-109658 A | 5/2009 |
| JP | 2009-180915 | 8/2009 |
| JP | 2009-192822 | 8/2009 |
| JP | 2011-22491 | 2/2011 |

OTHER PUBLICATIONS

U.S. Appl. No. 13/542,049, filed Jul. 5, 2012, Takeda, et al.
U.S. Appl. No. 13/562,647, filed Jul. 31, 2012, Takeda, et al.
Japanese Office Action issued Nov. 11, 2014, in Japan Patent Application No. 2011-176690 (with English translation).
Office Action issued Jul. 9, 2013, in Japanese patent Application No. 2011-176690 with English translation.

* cited by examiner

LIQUID CRYSTAL DISPLAY APPARATUS WITH FIRST AND SECOND SPACERS

CROSS-REFERENCE TO RELATED APPLICATIONS

This application is based upon and claims the benefit of priority from Japanese Patent Application No. 2011-176690, filed Aug. 12, 2011, the entire contents of which are incorporated herein by reference.

FIELD

Embodiments described herein relate generally to a liquid crystal display apparatus.

BACKGROUND

Recently, flat display apparatuses have been actively developed, and among others, a liquid crystal display apparatus has been particularly drawing attention for its advantages such as light weight, small thickness, and low power consumption. In particular, regarding an active matrix type liquid crystal display apparatus in which a switching element is incorporated in each pixel, attention has been focused on a structure that uses a lateral electric field (including a fringe electric field), such as an in-plane switching (IPS) mode and a fringe field switching (FFS) mode. The liquid crystal display apparatus of such a lateral electric field mode comprises a pixel electrode and a counter electrode that are formed in an array substrate, and switches a liquid crystal molecule by a lateral electric field substantially parallel to the main surface of the array substrate.

On the other hand, there has also been suggested a technique for switching liquid crystal molecules by a lateral electric field and an oblique electric field generated between a pixel electrode formed on an array substrate and a counter electrode formed on a counter substrate.

BRIEF DESCRIPTION OF THE DRAWINGS

FIG. 5 is a plan view schematically showing another structure example of one pixel PX when FIG. 1 is viewed from the side of the counter substrate;

FIG. 6 is a plan view schematically showing still another structure example of one pixel PX when FIG. 1 is viewed from the side of the counter substrate; and FIG. 7 is a plan view schematically showing still another structure example of one pixel PX when FIG. 1 is viewed from the side of the counter substrate.

DETAILED DESCRIPTION

A liquid crystal display apparatus according to an embodiment includes an array substrate, a counter substrate provided to face the array substrate, and a liquid crystal layer held in a gap formed by providing a spacer between the array substrate and the counter substrate.

The array substrate comprises a belt-shaped primary pixel electrode located along a first direction, source wiring lines extending along the first direction on two sides across the primary pixel electrode, an auxiliary capacitive line provided along a second direction that intersects with the first direction, a contact portion provided in a region where the primary pixel electrode intersects with the auxiliary capacitive line, and gate wiring lines extending along the second direction on two sides across the auxiliary capacitive line.

The counter substrate includes a common electrode provided along the first direction in a region facing the source wiring line.

The spacer is formed on at least the primary pixel electrode or the common electrode.

The spacer is preferably formed on the primary pixel electrode or the common electrode and on the gate wiring line or the auxiliary capacitive line.

In the liquid crystal display apparatus according to the embodiment, light transmittance is lower on the primary pixel electrode or the common electrode. Therefore, light leakage resulting from the disordered alignment of liquid crystal around the spacer can be well prevented by forming the spacer on the primary pixel electrode or the common electrode.

The spacer may be created either on the side of the array substrate or on the side of the counter substrate.

Hereinafter, the present embodiment will be described in detail with reference to the drawings. It is to be noted that components having identical or similar functions are provided with the same reference numerals throughout the drawings and are not repeatedly described.

Figure 1:
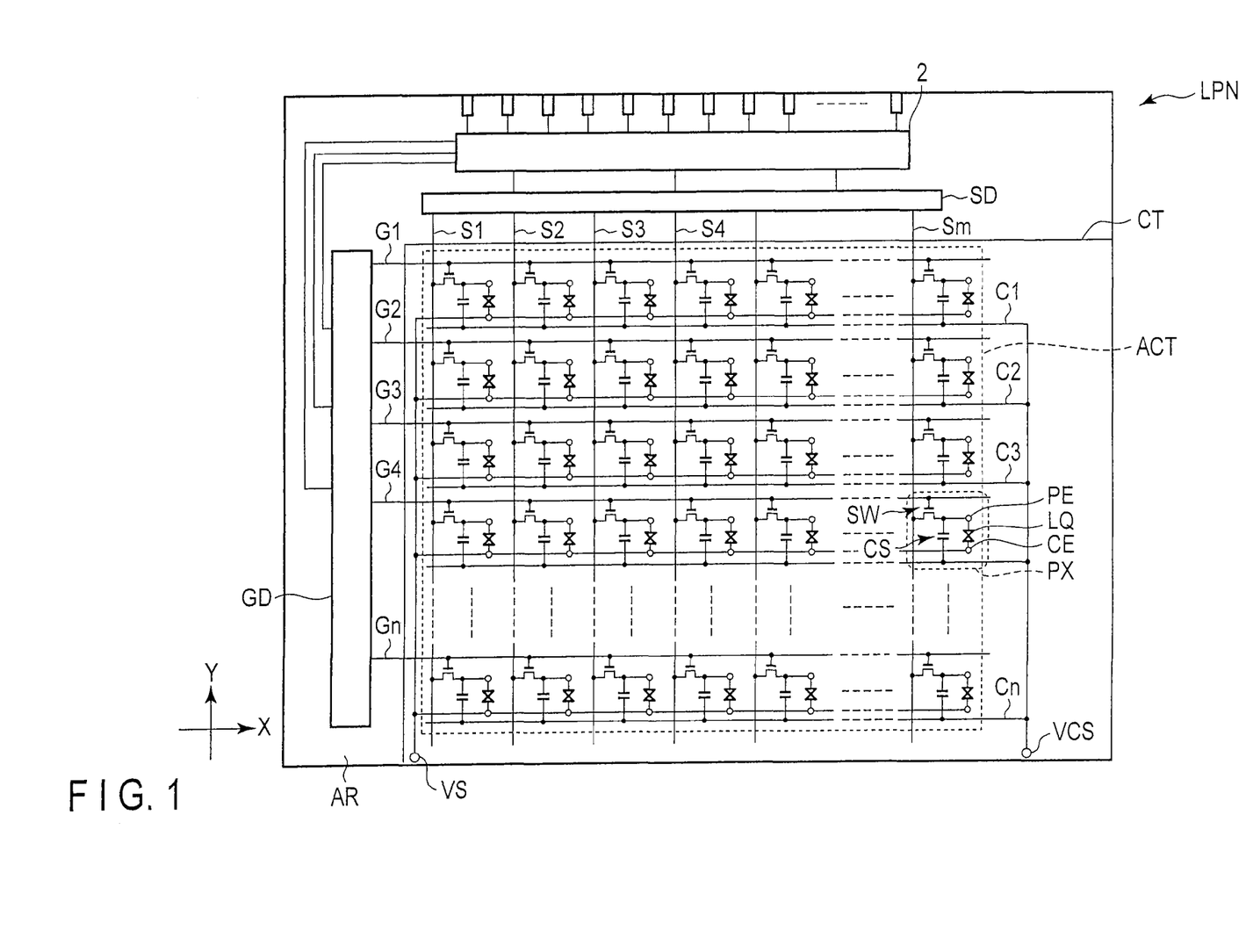
FIG. 1 is a diagram schematically showing the configuration and an equivalent circuit of a liquid crystal display apparatus according to an embodiment.

FIG. 1 is a diagram schematically showing the configuration and an equivalent circuit of the liquid crystal display apparatus according to the present embodiment.

That is, the liquid crystal display apparatus comprises an active matrix type liquid crystal display panel LPN. The liquid crystal display panel LPN comprises an array substrate AR which is a first substrate, a counter substrate CT which is a second substrate located to face the array substrate AR, and a liquid crystal layer LQ held in a gap formed via an unshown spacer between the array substrate AR and the counter substrate CT. Such a liquid crystal display panel LPN comprises an active area ACT for displaying images. The active area ACT comprises a plurality of m×n pixels PX arranged in matrix form (note that m and n are positive integers).

The liquid crystal display panel LPN comprises, in the active area ACT, n gate wiring lines G (G1 to Gn), n auxiliary capacitive lines C (C1 to Cn), and m source wiring lines S (S1 to Sm). The gate wiring lines G and the auxiliary capacitive lines C substantially linearly extend, for example, along a first direction X. The gate wiring lines G and the auxiliary capacitive lines C are alternately arranged in parallel along a second direction Y that intersects with the first direction X. Here, the first direction X and the second direction Y are substantially perpendicular to each other. The source wiring lines S intersect with the gate wiring lines G and the auxiliary capacitive lines C. The source wiring lines S substantially linearly extend along the second direction Y. The gate wiring lines G, the auxiliary capacitive lines C, and the source wiring lines S do not necessarily have to linearly extend and may be partly bent.

Each of the gate wiring lines G is drawn out of the active area ACT, and is connected to a gate driver GD. Each of the source wiring lines S is drawn out of the active area ACT, and is connected to a source driver SD. The gate driver GD and the source driver SD are at least partly connected to, for example, a drive IC chip 2 which is formed in the array substrate AR and which has a controller therein.

Each of the pixels PX comprises a switching element SW, a pixel electrode PE, and a common electrode CE. A retention capacity Cs is formed, for example, between the auxiliary capacitive line C and the pixel electrode PE. The auxiliary capacitive line C is electrically connected to a voltage applied section VCS to which an auxiliary capacitive voltage is applied.

In the present embodiment, the liquid crystal display panel LPN is configured to have the pixel electrode PE formed in the array substrate AR and at least part of the common electrode CE formed in the counter substrate CT. An electric field formed between the pixel electrode PE and the common electrode CE is mainly used to switch liquid crystal molecules in the liquid crystal layer LQ. The electric field formed between the pixel electrode PE and the common electrode CE is an oblique electric field slightly tilted relative to an X-Y plane defined by the first direction X and the second direction Y or relative to the main surface of the substrate (or is a lateral electric field substantially parallel to the main surface of the substrate).

The switching element SW comprises, for example, an n-channel thin film transistor (TFT). This switching element SW is electrically connected to the gate wiring line G and the source wiring line S. Such a switching element SW may be either a top gate type or a bottom gate type. Although a semiconductor layer of the switching element SW is made of, for example, polysilicon, the semiconductor layer may otherwise be made of amorphous silicon.

The pixel electrode PE is located in each of the pixels PX, and is electrically connected to the switching element SW. The common electrode CE is located to be shared by the pixel electrodes PE of the pixels PX via the liquid crystal layer LQ. The pixel electrode PE and the common electrode CE are made of a light-transmitting conductive material such as indium tin oxide (ITO) or indium zinc oxide (IZO), but may otherwise be made of other metal materials such as aluminum.

The array substrate AR comprises a power supply VS for applying a voltage to the common electrode CE. This power supply VS is formed, for example, outside the active area ACT. The common electrode CE is drawn out of the active area ACT, and is electrically connected to the power supply VS via an unshown conductive member.

Figure 2:
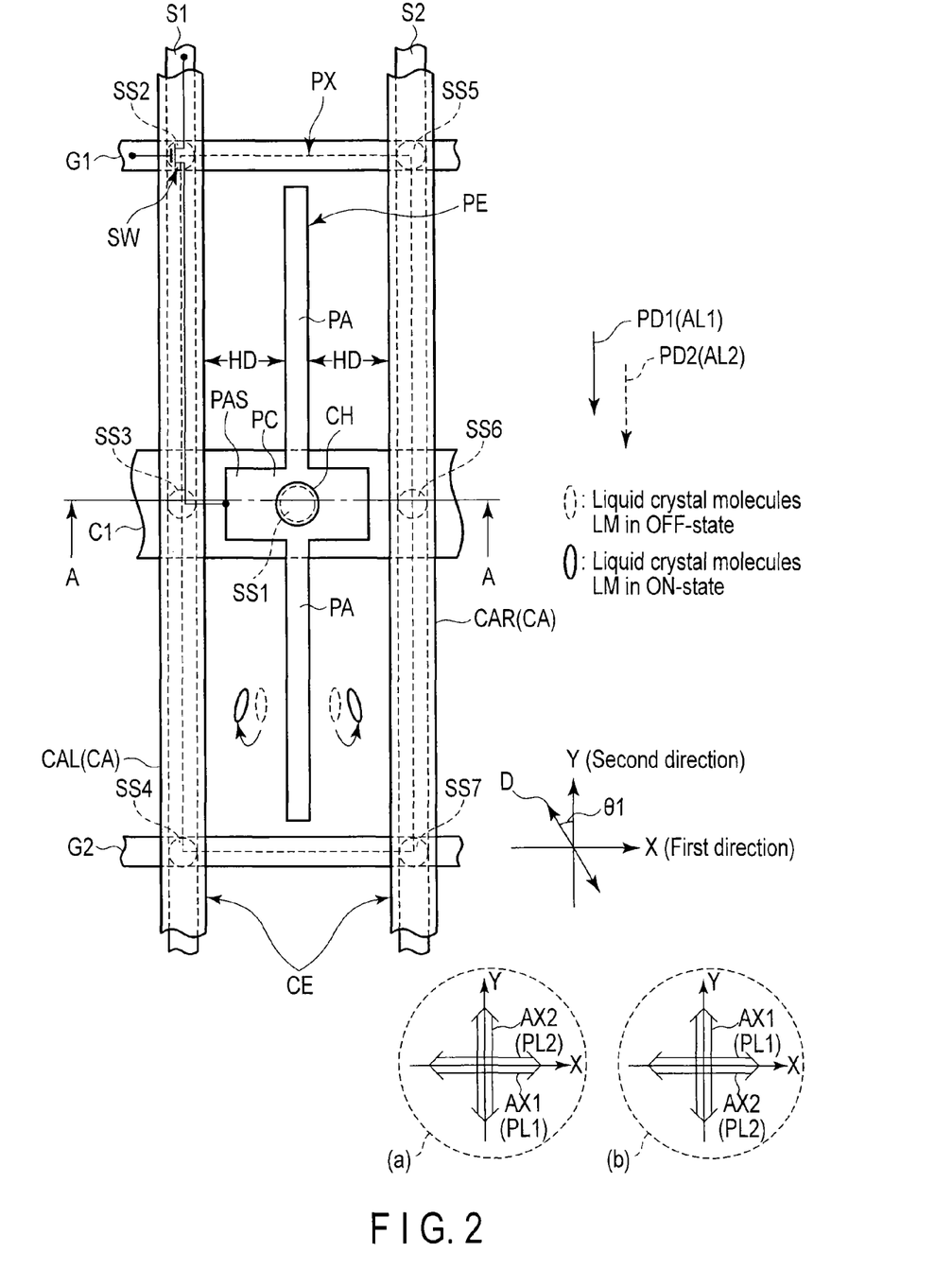
FIG. 2 is a plan view schematically showing a structure example of one pixel PX when a liquid crystal display panel LPN shown in FIG. 1 is viewed from the side of a counter substrate.

FIG. 2 is a plan view schematically showing a structure example of one pixel PX when the liquid crystal display panel LPN shown in FIG. 1 is viewed from the side of the counter substrate. Here, a plan view in the X-Y plane is shown.

The shown pixel PX has an oblong shape smaller in the length along the first direction X than in the length along the second direction Y, as indicated by broken lines. The gate wiring line G1 and the gate wiring line G2 extend along the first direction X. The auxiliary capacitive line C1 is located between the gate wiring line G1 and the gate wiring line G2 that are adjacent to each other. The auxiliary capacitive line C1 extends along the first direction X. The source wiring line S1 and the source wiring line S2 extends along the second direction Y. The pixel electrode PE is located between the source wiring line S1 and the source wiring line S2 that are adjacent to each other. This pixel electrode PE is also located between the gate wiring line G1 and the gate wiring line G2.

In the example shown, the source wiring line S1 is located at the left end of the pixel PX, and the source wiring line S2 is located at the right end. Strictly, the source wiring line S1 is located on the border between this pixel PX and the adjacent pixel at its left, and the source wiring line S2 is located on the border between this pixel PX and the adjacent pixel at its right. The gate wiring line G1 is located at the upper end of the pixel PX, and the gate wiring line G2 is located at the lower end. Strictly, the gate wiring line G1 is located on the border between this pixel PX and the adjacent pixel at its top, and the gate wiring line G2 is located on the border between this pixel PX and the adjacent pixel at its bottom. The auxiliary capacitive line C1 is located substantially in the center of the pixel.

In the example shown, the switching element SW is electrically connected to the gate wiring line G1 and the source wiring line S1. This switching element SW is provided at the intersection of the gate wiring line G1 and the source wiring line S1. A drain wiring line of the switching element SW extends along the source wiring line S1 and the auxiliary capacitive line C1, and is electrically connected to the pixel electrode PE via a contact hole CH formed in a region that overlaps the auxiliary capacitive line C1. Such a switching element SW is provided in a region that overlaps the source wiring line S1 and the auxiliary capacitive line C1, and hardly extends beyond the region that overlaps the source wiring line S1 and the auxiliary capacitive line C1, thus inhibiting the reduction of the area of an opening that contributes to display.

The pixel electrode PE comprises the primary pixel electrode PA and a contact portion PC electrically connected to each other. The primary pixel electrode PA linearly extends up to the vicinities of the upper and lower ends the pixel PX from the contact portion PC along the second direction Y. Such a primary pixel electrode PA is in a belt shape having substantially the same width along the first direction X. The contact portion PC is located in a region that overlaps the auxiliary capacitive line C1, and is electrically connected to the switching element SW via the contact hole CH. This contact portion PC is formed to be greater in width than the primary pixel electrode PA.

Such a pixel electrode PE is located at a substantially intermediate position between the source wiring line S1 and the source wiring line S2, that is, located in the center of the pixel PX. The distance between the source wiring line S1 and the pixel electrode PE along the first direction X is substantially equal to the distance between the source wiring line S2 and the pixel electrode PE along the first direction X.

The common electrode CE comprises primary common electrodes CA. In the X-Y plane, the primary common electrodes CA linearly extend along the second direction Y substantially parallel to the primary pixel electrode PA on two sides across the primary pixel electrode PA. Alternatively, the primary common electrodes CA respectively face the source wiring lines S, and extend substantially parallel to the primary pixel electrode PA. Such a primary common electrode CA is in a belt shape having substantially the same width along the first direction X.

In the example shown, two primary common electrodes CA are arranged parallel to each other along the first direction X, and are located at right and left ends of the pixel PX, respectively. Hereinafter, in order to differentiate these primary common electrodes CA, the left primary common electrode in the diagram is referred to as CAL, and the right primary common electrode in the diagram is referred to as CAR. The primary common electrode CAL faces the source wiring line S1, and the primary common electrode CAR faces the source wiring line S2. The primary common electrode CAL and the primary common electrode CAR are electrically connected to each other inside or outside the active area.

In the pixel PX, the primary common electrode CAL is located at the left end, and the primary common electrode CAR is located at the right end. Strictly, the primary common electrode CAL is located on the border between this pixel PX and the adjacent pixel at its left, and the primary common electrode CAR is located on the border between this pixel PX and the adjacent pixel at its right.

With regard to the positional relation between the pixel electrode PE and the primary common electrode CA, the pixel electrodes PE and the primary common electrodes CA are alternately arranged along the first direction X. The pixel electrodes PE and the primary common electrodes CA are arranged substantially parallel to each other. In this case, in the X-Y plane, none of the primary common electrodes CA overlap the pixel electrodes PE.

That is, one pixel electrode PE is located between the primary common electrode CAL and the primary common electrode CAR that are adjacent to each other. In other words, the primary common electrode CAL and the primary common electrode CAR are arranged on two sides across the position immediately above the pixel electrode PE. Alternatively, the pixel electrode PE is located between the primary common electrode CAL and the primary common electrode CAR. Thus, the primary common electrode CAL, the primary pixel electrode PA, and the primary common electrode CAR are arranged along the first direction X in this order.

The distance between the pixel electrode PE and the common electrode CE along the first direction X is substantially fixed. That is, the distance between the primary common electrode CAL and the primary pixel electrode PA along the first direction X is substantially equal to the distance between the primary common electrode CAR and the primary pixel electrode PA along the first direction X.

According to the embodiment, in the liquid crystal display panel shown in FIG. 2, at least one spacer is formed on the pixel electrode PE or the primary common electrode CA.

The spacer is preferably formed in a region on the pixel electrode PE or the primary common electrode CA and on the gate wiring line G or the retention capacity Cs which serves as a common wiring line. Such a region includes, for example, a region SS1 in the contact portion PC where the pixel electrode PE intersects with the retention capacity Cs, regions SS3 and SS6 where the primary common electrode CA intersects with the retention capacity Cs, and regions SS2, SS4, SS5, and SS7 where the primary common electrode CA intersects with the gate wiring line G. The spacer can be formed in at least one of these regions. Particularly preferably, the spacer can be provided in at least the contact hole CH of the contact portion PC.

Alternatively, the spacer can be provided on a secondary pixel electrode PAS provided along the second direction that intersects with the primary pixel electrode PA.

When two or more spacers are provided, spacers different in height from each other can be used. If the spacers different in height are provided, the liquid crystal display apparatus tends to be stronger against pressure on its surface, and the formation of air bubbles in the liquid crystal layer of the liquid crystal display panel under a low-temperature environment can be inhibited.

Figure 3:
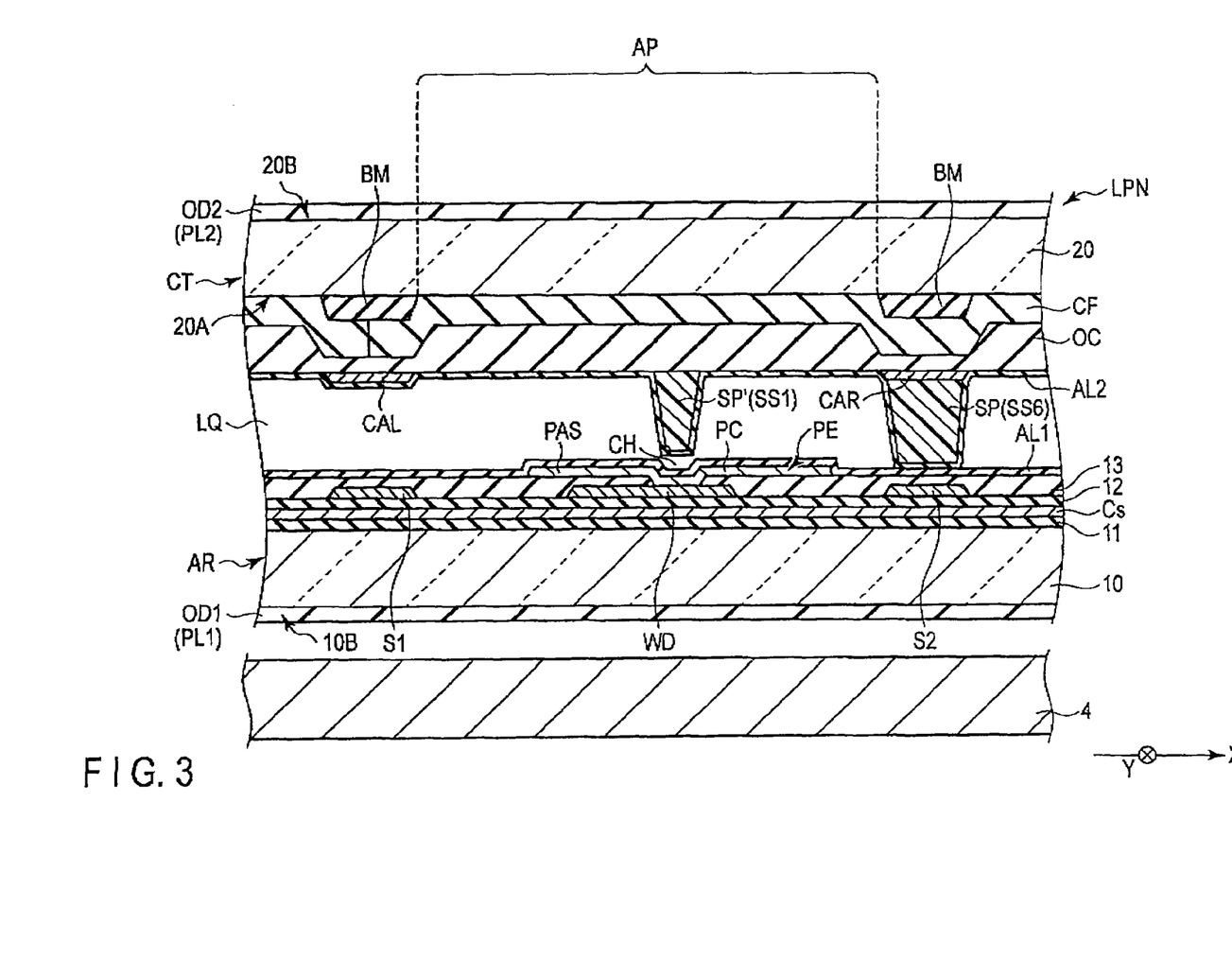
FIG. 3 is a sectional view schematically showing a sectional structure of the liquid crystal display panel LPN shown in FIG. 2 along the line A-A.

FIG. 3 is a sectional view schematically showing a sectional structure of the liquid crystal display panel LPN shown in FIG. 2 along the line A-A. Here, parts necessary for an explanation are only shown.

A backlight unit 4 is located in the rear of the array substrate AR that constitutes the liquid crystal display panel LPN. Various forms of backlight units 4 are applicable. Moreover, a backlight unit that uses a light-emitting diode (LED) or a cold cathode fluorescent lamp (CCFL) as a light source is also applicable. The detailed structure of the backlight unit is not described.

The array substrate AR is formed by using a light-transmitting first insulating substrate 10. The auxiliary capacitive line C1 extending in the first direction is formed on a first interlayer insulating film 11, and is covered by a second insulating film 12. The unshown gate wiring line is also formed between the first interlayer insulating film 11 and the second insulating film 12.

A drain electrode WD of the switching element, the source wiring line S1, and the source wiring line S2 are formed on the second insulating film 12, and is covered by a third insulating film 13. The drain electrode WD is located apart from the source wiring line S1 and the source wiring line S2, and positioned therebetween. The third insulating film 13 has the contact hole CH passing therethrough up to the drain electrode WD.

The contact portion PC of the pixel electrode PE, the primary common electrode CAL, and the primary common electrode CAR are formed on the upper surface of the same insulating film, that is, the upper surface of the third insulating film 13, but are located apart from one another. The contact portion PC extends in the contact hole CH, and is electrically connected to the drain electrode WD which is connected to the switching element. The pixel electrode PE having such a contact portion PC is located inside the positions immediately above the adjacent source wiring line S1 and source wiring line S2. That is, the pixel electrode PE is located between the primary common electrode CAL located immediately above the source wiring line S1 and the primary common electrode CAR located immediately above the source wiring line S2.

A first alignment film AL1 is located on the surface of the array substrate AR facing the counter substrate CT, and extends over substantially the entire active area ACT. This first alignment film AL1 is also located on the contact portion PC of the pixel electrode PE and on the third insulating film 13. Such a first alignment film AL1 is made of a material that shows a horizontal alignment property.

The array substrate AR may further comprise part of the common electrode CA.

The counter substrate CT is formed by using a light-transmitting second insulating substrate 20. This counter substrate CT comprises black matrixes BM, color filters CF, an overcoat layer OC, the common electrode CE, and a second alignment film AL2.

The black matrixes BM separate the pixels PX, and form an aperture AP facing the pixel electrode PE. That is, the black matrix BM is located to face wiring lines such as the source wiring lines S, the gate wiring lines, the auxiliary capacitive lines, and the switching element. Although a part of the black matrix BM that extends along the second direction Y is only shown here, the black matrix BM may comprise a part that extends along the first direction X. This black matrix BM is located in an inner surface 20A of the second insulating substrate 20 facing the array substrate AR.

The color filter CF is located to correspond to each pixel PX. That is, the color filter CF is located in the aperture AP in the inner surface 20A of the second insulating substrate 20, and is partly put on the black matrix BM. The color filters CF located in the pixels PX adjacent in the first direction X have different colors. For example, the color filters CF are made of resin materials having three primary colors including red, blue, and green. The red color filter CFR made of the red resin material is located to correspond to the red pixel. The blue color filter CFB made of the blue resin material is located to correspond to the blue pixel. The green color filter CFG made of the green resin material is located to correspond to the green pixel. The border between the color filters CF is located to overlap the black matrix BM.

The overcoat layer OC covers the color filter CF. This overcoat layer OC eases the influence of the unevenness of the surface of the color filter CF.

The common electrode CE is formed on the side of the overcoat layer OC facing the array substrate AR.

The second alignment film AL2 is located on the surface of the counter substrate CT facing the array substrate AR, and extends over substantially the entire active area ACT. This second alignment film AL2 covers the primary common electrode CAL and the common electrode CAR of the common electrode CE, and a spacer SP, and also covers the overcoat layer OC. Such a second alignment film AL2 is made of a material that shows a horizontal alignment property.

The first alignment film AL1 and the second alignment film AL2 have been subjected to an alignment process (e.g. rubbing and a light alignment process) for the initial alignment of the liquid crystal molecules in the liquid crystal layer LQ. A first alignment process direction PD1 in which the first alignment film AL1 initially aligns the liquid crystal molecules is parallel to and is opposite to or the same as a second alignment process direction PD2 in which the second alignment film AL2 initially aligns the liquid crystal molecules. For example, the first alignment process direction PD1 and the second alignment process direction PD2 are substantially parallel to and in the same direction as the second direction Y, as shown in FIG. 2.

The array substrate AR and the counter substrate CT described above are located so that the first alignment film AL1 and the second alignment film AL2 face each other. In this case, a columnar spacer SP which is integrally formed on one of the substrates, for example, by a resin material is located between the first alignment film AL1 of the array substrate AR and the second alignment film AL2 of the counter substrate CT, and a predetermined cell gap, for example, a cell gap of 2 to 7 μm is thereby formed. In FIG. 3, the columnar spacer SP is formed at the intersection of the source wiring line S2 and the auxiliary capacitive line C1. The array substrate AR and the counter substrate CT are affixed to each other by a sealing material SB outside the active area ACT so that the predetermined cell gap is formed.

The liquid crystal layer LQ is held in the cell gap formed by the spacer SP provided between the array substrate AR and the counter substrate CT, and is located between the first alignment film AL1 and the second alignment film AL2. Such a liquid crystal layer LQ is made of, for example, a liquid crystal material having positive dielectric anisotropy.

A first optical device OD1 is affixed, for example, by an adhesive agent to the outer surface of the array substrate AR, that is, an outer surface 10B of the first insulating substrate 10 that constitutes the array substrate AR. This first optical device OD1 is located on the side of the liquid crystal display panel LPN facing the backlight unit 4, and controls the polarization of incoming light coming into the liquid crystal display panel LPN from the backlight unit 4. This first optical device OD1 includes a first polarizing plate PL1 having a first polarization axis (or first absorption axis) AX1.

A second optical device OD2 is affixed, for example, by an adhesive agent to the outer surface of the counter substrate CT, that is, an outer surface 20B of the second insulating substrate 20 that constitutes the counter substrate CT. This second optical device OD2 is located on the display surface of the liquid crystal display panel LPN, and controls the polarization of outgoing light coming out of the liquid crystal display panel LPN. This second optical device OD2 includes a second polarizing plate PL2 having a second polarization axis (or second absorption axis) AX2.

The first polarization axis AX1 of the first polarizing plate PL1 and the second polarization axis AX2 of the second polarizing plate PL2 are, for example, perpendicularly positioned (cross-Nicol). In this case, one of the polarizing plates is located so that, for example, its polarization axis is parallel to or perpendicular to the initial alignment direction of the liquid crystal molecules, that is, the first alignment process direction PD1 or the second alignment process direction PD2. When the initial alignment direction is parallel to the second direction Y, the polarization axis of one of the polarizing plates is parallel to the second direction Y or parallel to the first direction X.

In FIG. 2, in an example indicated by (a), the first polarizing plate PL1 is located so that its first polarization axis AX1 is perpendicular to the initial alignment direction (second direction Y) of liquid crystal molecules LM (i.e. parallel to the first direction X), and the second polarizing plate PL2 is located so that its second polarization axis AX2 is parallel to the initial alignment direction of the liquid crystal molecules LM (i.e. parallel to the second direction Y).

In FIG. 2, in an example indicated by (b), the second polarizing plate PL2 is located so that its second polarization axis AX2 is perpendicular to the initial alignment direction (second direction Y) of the liquid crystal molecules LM (i.e. parallel to the first direction X), and the first polarizing plate PL1 is located so that its first polarization axis AX1 is parallel to the initial alignment direction of the liquid crystal molecules LM (i.e. parallel to the second direction Y).

Although the columnar spacer SP is provided in the region SS6 in FIG. 2 where the source wiring line S and the auxiliary capacitive line C intersect with each other in the example shown in FIG. 3, the region to form the columnar spacer SP may be any one of the regions SS1 to SS7 in FIG. 2. If necessary, the columnar spacers SP may be formed in two or more regions.

Here, more than one such spacers SP can be provided in the liquid crystal display apparatus. Spacers of the same height may be provided, or if necessary, spacers different in height may be provided. For example, the spacer SP is disposed in the part SS6 where the common electrode CAR intersects with the auxiliary capacitive line C1, and a second spacer SP' is also disposed in the part SS1 of the contact hole CH in which the auxiliary capacitive line C1 intersects with the pixel electrode PE and which connects the pixel electrode PE and the drain electrode WD. This allows the spacers to be provided in parts of the liquid crystal layer different in thickness. Therefore, when the display surface is not pressed, the space between the substrates is only held by the spacer disposed at the intersection of the auxiliary capacitive line C1 and the pixel electrode PE. However, when the display surface is pressed, the space between the substrates is held not only by the spacer disposed in the part SS6 but also by the spacer in the part SS1 of the contact hole CH. Thus, the strength against pressure on the surface is increased. Under a low-temperature environment, the contraction percentage of the liquid crystal layer is higher than the contraction percentage of the spacer. Therefore, if a large number of spacers are disposed, the contraction of the spacers cannot follow the contraction of the liquid crystal layer, and air bubbles may be formed. However, the spacer disposed in the part SS1 of the contact hole does not contact the substrate facing this spacer because the space of the liquid crystal layer is as large as the depth of the contact hole. Consequently, the contraction of the spacers follows the contraction of the liquid crystal layer well, and the formation of air bubbles in the liquid crystal layer can be prevented.

The spacer SP can be formed by using, for example, a photosensitive resin and patterning the resin through exposure and development. The height of the spacer can be adjusted by adjusting the exposure amount.

The spacer SP may be formed either on the side of the array substrate or on the side of the counter substrate. The spacer SP when formed on the side of the array substrate tends to cause less misalignment during assembly.

The spacer SP may be either transparent or colored.

The following liquid crystal display apparatuses were produced and their contrasts were measured: a liquid crystal display apparatus in which one transparent spacer was provided for each pixel in the region SS6 shown in FIG. 2 by using a photosensitive resin, a liquid crystal display apparatus in which one spacer was provided for each pixel in the region SS5, and a liquid crystal display apparatus in which one spacer was provided for each pixel in the region SS1 as shown in FIG. 2. The contrasts obtained as a result were 620, 580, and 620, respectively. In contrast, by way of comparison, the spacer was formed not on the primary pixel electrode or the common electrode but at the position of a part where light was not blocked. The contrast measured was an inadequate value of 430.

In the present embodiment, the liquid crystal molecules on the pixel electrode or the common electrode are not moved by an electric field and therefore do not contribute to transmittance. In other words, the part on the pixel electrode or the common electrode is naturally a part where light is blocked. If the spacer is disposed in this part, the spacer can be disposed without decreasing transmittance. As the liquid crystal molecules on the pixel electrode or the common electrode are not activated by an electric field, there is no leakage of light resulting from the disordered alignment caused by the spacer. This proves that the contrast is improved when the spacer is formed on the primary pixel electrode or the common electrode.

Now, the operation of the liquid crystal display panel LPN having the above configuration is described with reference to FIG. 2 and FIG. 3.

When no voltage is applied to the liquid crystal layer LQ, that is, when no potential difference (electric field) is formed between the pixel electrode PE and the common electrode CE (off-state), the major axes of the liquid crystal molecules LM of the liquid crystal layer LQ are aligned to be in the first alignment process direction PD1 of the first alignment film AL1 and in the second alignment process direction PD2 of the second alignment film AL2. This off-state corresponds to an initial alignment state, and the alignment direction of the liquid crystal molecules LM in the off-state corresponds to the initial alignment direction.

Strictly, the liquid crystal molecules LM are not necessarily aligned parallel to the X-Y plane, and are often pretilted. Therefore, the initial alignment direction of the liquid crystal molecules LM here is the direction in which the major axes of the liquid crystal molecules LM in the off-state are orthogonally projected in the X-Y plane. In the following explanation, for simplicity, the liquid crystal molecules LM are aligned parallel to the X-Y plane, and are rotated in a plane parallel to the X-Y plane.

Here, both the first alignment process direction PD1 and the second alignment process direction PD2 are substantially parallel to the second direction Y. In the off-state, the major axes of the liquid crystal molecules LM are initially aligned in a direction substantially parallel to the second direction Y, as indicated by broken lines in FIG. 2. That is, the initial alignment direction of the liquid crystal molecules LM is parallel to the second direction Y (or 0° to the second direction Y).

When the first alignment process direction PD1 and the second alignment process direction PD2 are parallel and in the same direction as in the example shown, the liquid crystal molecules LM are aligned substantially horizontally (at a pretilt angle of about zero) in the vicinity of the intermediate part of the liquid crystal layer LQ in the section of the liquid crystal layer LQ. The liquid crystal molecules LM are aligned at such a pretilt angle that the molecules in the vicinity of the first alignment film AL1 and the molecules in the vicinity of the second alignment film AL2 are symmetrical with respect to this part (splay alignment).

Here, if the first alignment film AL1 is aligned in the first alignment process direction PD1, the liquid crystal molecules LM in the vicinity of the first alignment film AL1 are initially aligned in the first alignment process direction PD1. If the second alignment film AL2 is aligned in the second alignment process direction PD2, the liquid crystal molecules LM in the vicinity of the second alignment film AL2 are initially aligned in the second alignment process direction PD2. When the first alignment process direction PD1 and the second alignment process direction PD2 are parallel and in the same direction, the liquid crystal molecules LM are splay-aligned as described above, and the alignment of the liquid crystal molecules LM in the vicinity of the first alignment film AL1 on the array substrate AR and the alignment of the liquid crystal molecules LM in the vicinity of the second alignment film AL2 on the counter substrate CT are vertically symmetrical with respect to the intermediate part of the liquid crystal layer LQ as described above. This also provides optical compensation in a direction tilted from the normal direction of the substrate. Therefore, when the first alignment process direction PD1 and the second alignment process direction PD2 are parallel and in the same direction, there is a little leakage of light in the case of black display, thereby enabling a high contrast ratio and improved display quality.

When the first alignment process direction PD1 and the second alignment process direction PD2 are parallel and in the opposite directions, the liquid crystal molecules LM are aliened at a substantially uniform pretilt angle in the vicinity of the first alignment film AL1, in the vicinity of the second alignment film AL2, and in the intermediate part of the liquid crystal layer LQ in the section of the liquid crystal layer LQ (homogeneous alignment).

Backlight from the backlight unit 4 partly passes through the first polarizing plate PL1, and comes into the liquid crystal display panel LPN. The polarization of the light which has come into the liquid crystal display panel LPN varies depending on the alignment state of the liquid crystal molecules LM when the light passes through the liquid crystal layer LQ. In the off-state, the light which has passed through the liquid crystal layer LQ is absorbed by the second polarizing plate PL2 (black display).

In the meantime, when a voltage is applied to the liquid crystal layer LQ, that is, when a potential difference (electric field) is formed between the pixel electrode PE and the common electrode CE (on-state), a lateral electric field (or an oblique electric field) substantially parallel to the substrate is formed between the pixel electrode PE and the common electrode CE. The major axes of the liquid crystal molecules LM are rotated in a plane substantially parallel to the X-Y plane under the influence of the electric field, as indicated by solid lines in the drawing.

In the example shown in FIG. 2, the liquid crystal molecules LM in a region between the pixel electrode PE and the primary common electrode CAL are rotated clockwise relative to the second direction Y, and are aligned toward the lower left in the drawing. The liquid crystal molecules LM in a region between the pixel electrode PE and the primary common electrode CAR are rotated counterclockwise relative to the second direction Y, and are aligned toward the lower right in the drawing.

When an electric field is thus formed between the pixel electrode PE and the common electrode CE in each of the pixels PX, the alignment direction of the liquid crystal molecules LM is divided into a plurality of directions from the position that overlaps the pixel electrode PE, and a domain is formed in each alignment direction. That is, a plurality of domains are formed in one pixel PX.

In this on-state, the backlight which has come into the liquid crystal display panel LPN from the backlight unit 4 partly passes through the first polarizing plate PL1, and comes into the liquid crystal display panel LPN. The backlight which has come into the liquid crystal layer LQ changes its polarization state. In this on-state, at least part of the light which has passed through the liquid crystal layer LQ passes through the second polarizing plate PL2 (white display).

Figure 4:
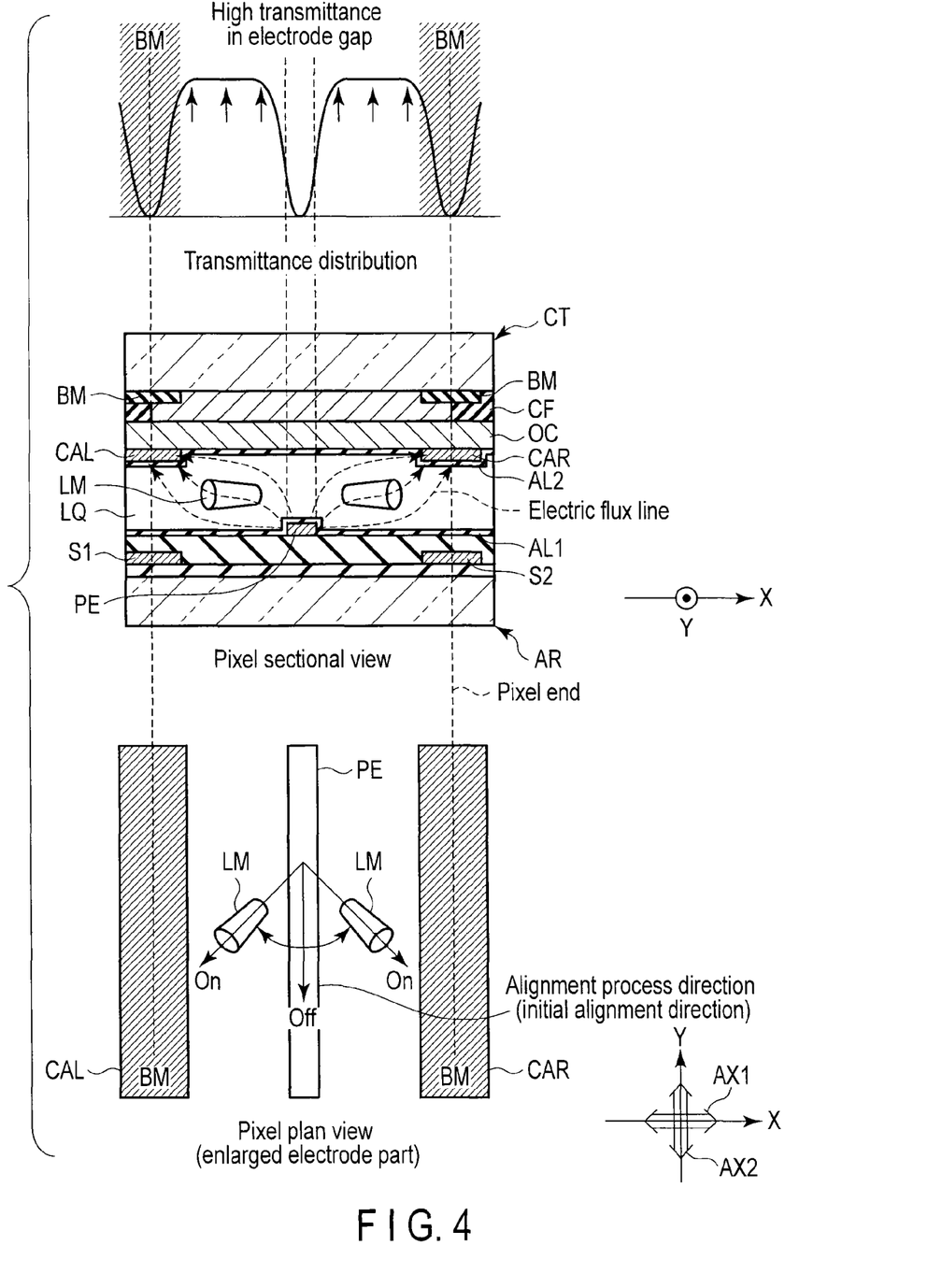
FIG. 4 is a sectional view schematically showing a sectional structure of the liquid crystal display panel LPN shown in FIG. 2 along the line A-A.

FIG. 4 is a diagram illustrating an electric field formed between the pixel electrode PE and the common electrode CE in the liquid crystal display panel LPN shown in FIG. 2, and the relationship between the director and transmittance of the liquid crystal molecules LM associated with the electric field.

In the off-state, the liquid crystal molecules LM are initially aligned in a direction substantially parallel to the second direction Y. In the on-state in which a potential difference is formed between the pixel electrode PE and the common electrode CE, the optical modification rate of the liquid crystal is maximized (i.e. the transmittance in the aperture is maximized) when the director of the liquid crystal molecules LM (or the direction of the major axes of the liquid crystal molecules LM) is shifted about 45° in the X-Y plane relative to the first polarization axis AX1 of the first polarizing plate PL1 and the second polarization axis AX2 of the second polarizing plate PL2.

In the example shown, in the on-state, the director of the liquid crystal molecules LM between the primary common electrode CAL and the pixel electrode PE is substantially parallel to an azimuth of 45°-225° in the X-Y plane, and the director of the liquid crystal molecules LM between the primary common electrode CAR and the pixel electrode PE is substantially parallel to an azimuth of 135°-315° in the X-Y plane, so that a peak transmittance is obtained. Here, if attention is focused on a transmittance distribution per pixel, transmittance is substantially zero on the pixel electrode PE and on the common electrode CE, while a high transmittance is obtained over the entire region in an electrode gap between the pixel electrode PE and the common electrode CE.

The primary common electrode CAL located immediately above the source wiring line S1 and the primary common electrode CAR located immediately above the source wiring line S2 respectively face the black matrixes BM. However, both the primary common electrode CAL and the primary common electrode CAR have a width equal to or less than the width of the black matrix BM along the first direction X, and do not extend toward the pixel electrode PE from the position that overlaps the black matrix BM. Therefore, the aperture contributing to display per pixel corresponds to the regions between the pixel electrode PE and the primary common electrode CAL as well as the primary common electrode CAR out of the region between the black matrixes BM or between the source wiring line S1 and the source wiring line S2.

According to the present embodiment, it is possible to obtain a liquid crystal display apparatus which allows a great view angle and high contrast and in which the leakage of light resulting from the disordered liquid crystal alignment around the spacer is prevented by providing the spacer on the pixel electrode or the common electrode having low light transmittance.

Moreover, if the spacer is provided on the primary pixel electrode or the common electrode and on the gate wiring line or the common wiring line, the leakage of light resulting from the disordered liquid crystal alignment around the spacer is more effectively prevented because the region having low light transmittance is large. Accordingly, it is possible to obtain a liquid crystal display apparatus which allows a great view angle and high contrast.

Furthermore, according to the present embodiment, a high transmittance can be obtained in the electrode gap between the pixel electrode PE and the common electrode CE. Therefore, in order to sufficiently increase the transmittance per pixel, it is possible to increase the inter-electrode distances between the pixel electrode PE and the primary common electrode CAL as well as the primary common electrode CAR. Moreover, for product specifications different in pixel pitch, a peak condition of a transmittance distribution shown in FIG. 4 can be used by changing the inter-electrode distance (i.e. by changing the location of the primary common electrode CA relative to the pixel electrode PE located substantially in the center of the pixel PX). That is, in the display mode according to the present embodiment, the microprocessing of the electrodes is not always needed from the product specification having a relatively large pixel pitch and relatively low resolution to the product specification having a relatively small pixel pitch and relatively high resolution, and products with various pixel pitches can be provided by setting the inter-electrode distance. Therefore, it is possible to readily fulfill demands for higher transmittance and higher resolution.

According to the present embodiment, as shown in FIG. 4, the transmittance is sufficiently reduced if attention is focused on a transmittance distribution in the region that overlaps the black matrix BM. The reason is that there is no electric field leakage outside the pixel from the position of the common electrode CE and that no undesired lateral electric field is generated between the pixels adjacent across the black matrix BM so that the liquid crystal molecules in the region that overlaps the black matrix BM maintains the initial alignment state as in the off-state (or the black display). Therefore, even when the color filters of the adjacent pixels are different in color, the mixing of colors can be inhibited, and the reduction of color reproduction and the reduction of the contrast ratio can be inhibited.

When the array substrate AR and the counter substrate CT are out of alignment, the horizontal inter-electrode distance of the common electrodes CE on two sides across the pixel electrode PE may vary. However, such misalignment is caused in all the pixels PX, and therefore produces no difference of electric field distribution among the pixels PX and has a significantly small influence on the display of images. Even if the array substrate AR and the counter substrate CT are out of alignment, undesired electric field leakage to the adjacent pixels can be inhibited. Therefore, even when the color filters of the adjacent pixels are different, the mixing of colors can be inhibited, and the reduction of color reproduction and the reduction of the contrast ratio can be inhibited.

According to the present embodiment, each of the primary common electrodes CA faces the source wiring line S. Especially when the primary common electrode CAL and the primary common electrode CAR are respectively located immediately above the source wiring line S1 and the source wiring line S2, the aperture AP can be expanded and the transmittance of the pixel PX can be improved as compared with the case where the primary common electrode CAL and the primary common electrode CAR are located closer to the pixel electrode PE than the source wiring line S1 and the source wiring line S2.

The primary common electrode CAL and the primary common electrode CAR are respectively located immediately above the source wiring line S1 and the source wiring line S2, so that the inter-electrode distances between the pixel electrode PE and the primary common electrode CAL as well as the primary common electrode CAR can be increased, and a more horizontal lateral electric field can be formed. This makes it possible to maintain a greater view angle which is an advantage of, for example, an IPS mode that is a conventional configuration.

According to the present embodiment, a plurality of domains can be formed in one pixel. Thus, the view angle can be optically compensated in a plurality of directions, and a greater view angle can be obtained.

(Advantageous Effects Specific to SOL)

Although the initial alignment direction of the liquid crystal molecules LM is parallel to the second direction Y in the example described above, the initial alignment direction of the liquid crystal molecules LM may be a diagonal direction D that diagonally intersects with the second direction Y as shown in FIG. 2. Here, an angle θ1 of the initial alignment direction D with the second direction Y is an angle more than 0° and less than 45°. The angle θ1 is highly effective in controlling the alignment of the liquid crystal molecules LM when about 5° to 30°, preferably 20° or less. That is, the initial alignment direction of the liquid crystal molecules LM is preferably substantially parallel to a direction that is angled at 0° to 20° with the second direction Y.

Although the liquid crystal layer LQ is made of a liquid crystal material having positive dielectric anisotropy in the example described above, the liquid crystal layer LQ may be made of a liquid crystal material having negative dielectric anisotropy. However, although not described in detail, the polarity of the dielectric anisotropy is reversed, so that the angle θ1 is preferably 45° to 90°, particularly preferably 70° or more in the case of a negative liquid crystal material.

Almost no lateral electric field is formed (or no electric field sufficient to drive the liquid crystal molecules LM is formed) on the pixel electrode PE or the common electrode CE even in the on-state, so that the liquid crystal molecules LM hardly move from the initial alignment direction as in the off-state. Therefore, even if the pixel electrode PE and the common electrode CE are made of a light-transmitting conductive material such as ITO, the backlight hardly passes through these regions and hardly contributes to display in the on-state. Therefore, the pixel electrode PE and the common electrode CE do not necessarily have to be made of a transparent conductive material, and may be made of a conductive material such as aluminum, silver, or copper.

Figure 5:
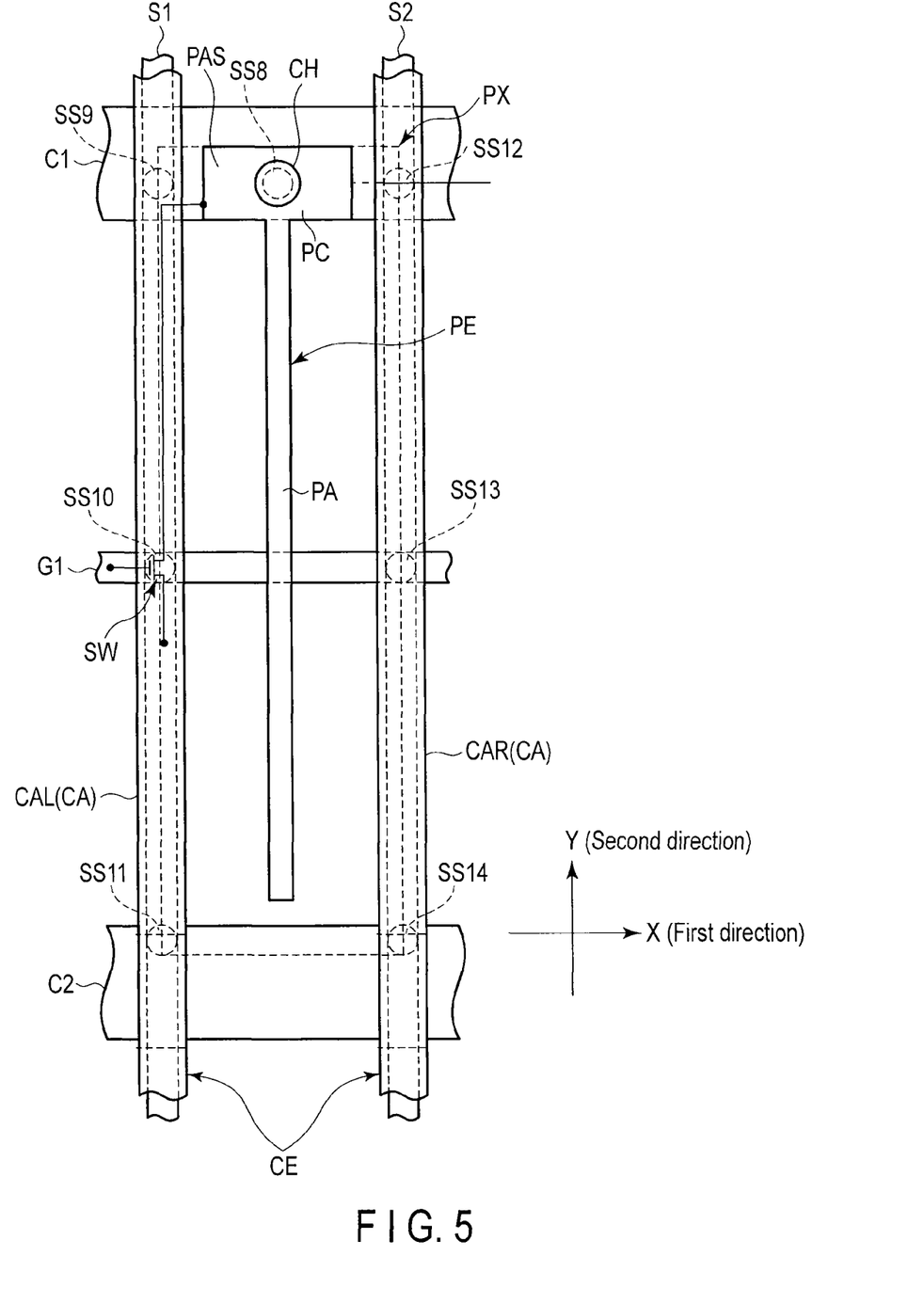

FIG. 5 is a plan view schematically showing another structure example of one pixel PX when the liquid crystal display panel LPN shown in FIG. 1 is viewed from the side of the counter substrate.

This structure example is different from the structure example shown in FIG. 2 in that the auxiliary capacitive line C1 is located at the upper end of the pixel PX, the auxiliary capacitive line C2 is located at the lower end of the pixel PX, and the gate wiring line G1 is located substantially in the center of the pixel PX.

That is, the auxiliary capacitive line C1 and the auxiliary capacitive line C2 extend along the first direction X. The gate wiring line G is located between the auxiliary capacitive line C1 and the auxiliary capacitive line C2 that are adjacent to each other, and extends along the first direction X. The source wiring line S1 and the source wiring line S2 extend along the second direction Y. This structure example is similar to the structure example shown in FIG. 2 in that the source wiring line S1 is located at the left end of the pixel PX, the source wiring line S2 is located at the right end, and the switching element SW is electrically connected to the gate wiring line G1 and the source wiring line S1 and formed in the region that overlaps the source wiring line S1 and the auxiliary capacitive line C1.

The pixel electrode PE comprises the contact portion PC that overlaps the auxiliary capacitive line C1 at the upper end of the pixel PX, and the primary pixel electrode PA extending along the second direction Y from the contact portion PC to the vicinity of the lower end of the pixel PX. Such a pixel electrode PE is electrically connected to the switching element SW via the contact hole CH in the contact portion PC.

As in the structure example shown in FIG. 2, the common electrodes CE are arranged on two sides across the pixel electrode PE in the X-Y plane.

As in the structure example shown in FIG. 2, at least one spacer is formed on the pixel electrode PE or the primary common electrode CA.

The spacer is preferably formed in a region on the pixel electrode PE or the primary common electrode CA and on the gate wiring line G or the retention capacity Cs which serves as a common wiring line. Such a region includes, for example, a region SS8 in the contact portion PC where the pixel electrode PE intersects with the retention capacity Cs, regions SS9, SS11, SS12, and SS14 where the primary common electrode CA intersects with the retention capacity Cs, and regions SS10 and SS13 where the primary common electrode CA intersects with the gate wiring line G. The spacer can be formed in at least one of these regions. Particularly preferably, the spacer can be provided in at least the contact portion PC.

Furthermore, as in the structure example shown in FIG. 2, when two or more spacers are provided, spacers different in height from each other can be used. If the spacers different in height are provided, the liquid crystal display apparatus can be stronger against pressure on its surface, and the formation of air bubbles in the liquid crystal layer resulting from, for example, external shock under a low-temperature environment can be inhibited.

Such a structure example also permits advantageous effects similar to those in the structure example shown in FIG. 2 to be obtained.

Figure 6:
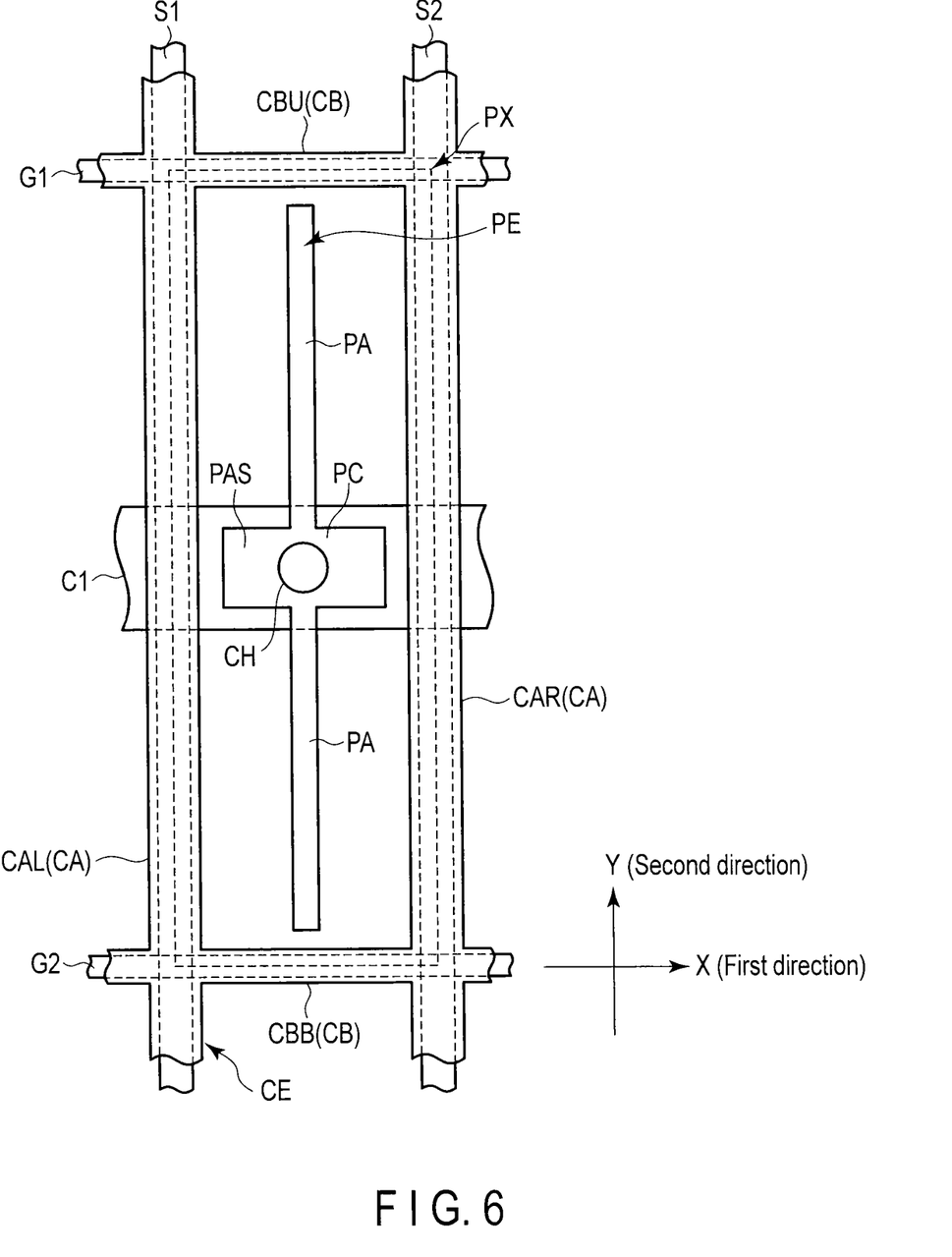

FIG. 6 is a plan view schematically showing still another structure example of one pixel PX when the liquid crystal display panel LPN shown in FIG. 1 is viewed from the side of the counter substrate.

This structure example is different from the structure example shown in FIG. 2 in that the common electrode CE is lattice-shaped to surround one pixel PX.

That is, the common electrode CE includes a secondary common electrode CB extending along the first direction X, in addition to the above-described primary common electrode CA. The primary common electrode CA and the secondary common electrode CB are integrally or continuously formed.

The secondary common electrodes CB face the respective gate wiring lines G. In the example shown, two secondary common electrodes CB are arranged parallel to each other along the first direction X. Hereinafter, in order to differentiate these secondary common electrodes CB, the upper secondary common electrode in the diagram is referred to as CBU, and the lower secondary common electrode in the diagram is referred to as CBB. The secondary common electrode CBU is located at the upper end of the pixel PX, and faces the gate wiring line G1. That is, the secondary common electrode CBU is located on the border between this pixel PX and the upper adjacent pixel. The secondary common electrode CBB is located at the lower end of the pixel PX, and faces the gate wiring line G2. That is, the secondary common electrode CBB is located on the border between this pixel PX and the lower adjacent pixel.

The spacer is formed in the same region as in FIG. 2.

Such a structure example also permits advantageous effects similar to those in the structure example shown in FIG. 2 to be obtained.

Figure 7:
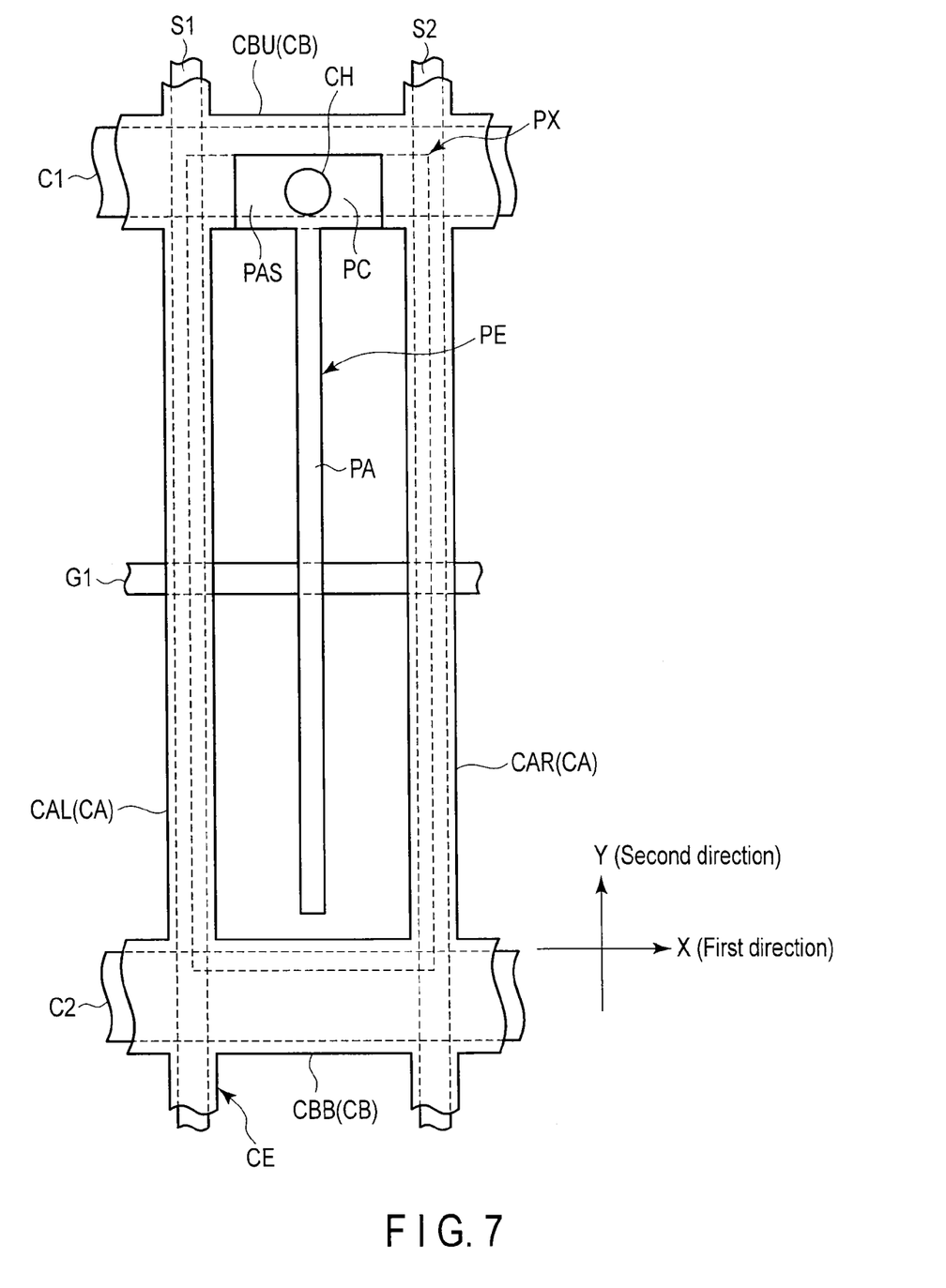

FIG. 7 is a plan view schematically showing still another structure example of one pixel PX when the liquid crystal display panel LPN shown in FIG. 1 is viewed from the side of the counter substrate.

This structure example is different from the structure example shown in FIG. 5 in that the common electrode CE is lattice-shaped to surround one pixel PX.

That is, the common electrode CE includes a secondary common electrode CB extending along the first direction X, in addition to the above-described primary common electrode CA. The primary common electrode CA and the secondary common electrode CB are integrally or continuously formed. The secondary common electrodes CB face the respective auxiliary capacitive lines C. The secondary common electrode CBU located at the upper end of the pixel PX faces the auxiliary capacitive line C1. The secondary common electrode CBB located at the lower end of the pixel PX faces the auxiliary capacitive line C2.

The spacer is formed in the same region as in FIG. 5.

Such a structure example also permits advantageous effects similar to those in the structure example shown in FIG. 2 to be obtained.

In the present embodiment, the common electrode CE may comprise, in addition to the primary common electrode CA provided in the counter substrate CT, a second primary common electrode which is provided in the array substrate AR and which faces the primary common electrode CA (or faces the source wiring line S). This second primary common electrode extends substantially parallel to the primary common electrode CA and is in phase with the primary common electrode CA. An undesired electric field from the source wiring line S can be blocked by providing the second primary common electrode. Moreover, the common electrode CE may comprise, in addition to the primary common electrode CA provided in the counter substrate CT, a second secondary common electrode which is provided in the array substrate AR and which faces the gate wiring line G and the auxiliary capacitive line C. This second secondary common electrode extends in a direction that intersects with the primary common electrode CA and is in phase with the primary common electrode CA. An undesired electric field from the gate wiring line G and the auxiliary capacitive line C can be blocked by providing the second secondary common electrode. According to the configuration provided with the second primary common electrode and the second secondary common electrode, it is possible to inhibit further deterioration of the display quality.

Furthermore, in the present embodiment, the pixel electrode PE may comprise a secondary pixel electrode in a direction that intersects with the primary pixel electrode PA. This secondary pixel electrode may have the function of the contact portion PC which is electrically connected to the switching element SW via the contact hole. When the secondary pixel electrode is provided substantially in the center of the pixel PX, the pixel electrode PE is cross-shaped. By providing such a secondary pixel electrode, more domains can be formed in one pixel PX, and the view angle can be increased.

In the present embodiment, the pixel electrode PE may comprise a plurality of primary pixel electrodes PA arranged substantially parallel to each other at intervals in the first direction X. In this case, such a relation is maintained that the common electrode CE is located between the adjacent primary pixel electrodes PA and that the primary pixel electrodes PA and the primary common electrodes CA are alternately arranged along the first direction X.

As described above, according to the present embodiment, it is possible to provide a liquid crystal display apparatus in which deterioration of display quality can be inhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A liquid crystal display apparatus comprising:
an array substrate comprising (i) a gate wiring line extend g along a first direction, (ii) an auxiliary capacitive line extending along a first direction parallel to the gate wiring line, (iii) a pixel electrode including a belt-shaped primary pixel electrode located along a second direction that intersects with the first direction and a contact portion which is integrally formed with the primary pixel electrode and includes a contact hole located in a region that overlaps the auxiliary capacitive line, and (iv) a source wiring line extending along the second direction parallel to the primary pixel electrode;
a counter substrate comprising a common electrode provided along the second direction in a region facing the source wiring line; and
a first spacer, a second spacer and a liquid crystal layer, which are held between the array substrate and the counter substrate,
wherein the first spacer is provided at an intersection of the source wiring line and the auxiliary capacitive line, and the second spacer is provided in the contact hole,
the contact portion is formed to be greater in width along the first direction than the primary pixel electrode at a region where the primary pixel electrode overlaps the auxiliary capacitive line, and a width along the second direction of the contact portion is smaller than that of the auxiliary capacitive line.
2. The liquid crystal display apparatus according to claim 1, wherein the counter substrate further comprises an alignment film, and the first spacer is formed on the common electrode and covered with the alignment film.

* * * * *